PROCESS FOR PREPARING A DRIED RICE CEREAL PRODUCT

Vincent J. Kelly, Wayne J. Smalligan, and Larry L. Cloud, Fremont, Mich., assignors to Gerber Products Company, Fremont, Mich.
No Drawing. Filed Nov. 3, 1969, Ser. No. 873,667
Int. Cl. A23l 1/10
U.S. Cl. 99—83          3 Claims

ABSTRACT OF THE DISCLOSURE

A process for obtaining a dehydrated reconstitutable rice cereal by incorporating an ester-containing organic releasing agent containing at least one phosphatide linkage, in a rice cereal slurry prior to dehydration of the slurry surface.

---

This invention relates to the preparation of a precooked, dehydrated, rice cereal product that is rapidly reconstitutable with liquid to form a homogeneous smooth textured rice cereal mass suitable for infant feeding.

The new product is made with the addition of certain release agents to the starting rice cereal slurry prior to its dehydration so that the dried slurry is readily and substantially completely removable from the drying surface employed. Ready release simplifies practical commercial problems of removing the dried slurry on a continuous basis without equipment shut-down due to adhesion of slurry on the dryer. It also avoids over-cooking and adds to the natural flavor and appearance of the product.

In essence, the invention contemplates formation of a slurry containing substantial quantities of rice cereal flour. An effective amount of an ester-emulsifier, as hereinafter defined, is incorporated in the slurry to create the desired release properties. The present invention is based upon the discovery that this special group of emulsifiers (as distinguished from all other types of emulsifiers which do not aid in the present context) will facilitate release and enhance flavor or dried rice cereal sheets.

Pre-cooked, dried products, which lend themselves to easy reconstitution or rehydration to yield a smooth, fluffy textured, edible mass when mixed with a liquid such as milk or water, have found increasing use in the feeding of infants and adults who require geriatric or post-operative care. Dehydrated products of this general type are available to the consumer in the cereal form. These dehydrated products can be produced by preparing a paste or thick suspension, i.e., a slurry or puree, obtained by heating the raw materials to form a pulp which may be strained or sieved to ensure uniform particle size; The slurry or puree is then applied to the surface of conventional drying equipment such as a drum dryer, where substantially all (90–98%) of the water contained therein is removed. The dried product is conveniently flaked and packaged for use.

Purees formed from cereals other than rice are readily removed from the drying surface by scraping with doctor blades. When the dehydrated puree is prepared from a rice cereal, however, the puree dehydrates to a sticky, plastic sheet which is difficult to remove from the drying surface. In the case of a rice cereal puree, it is necessary not only to employ scrapers (doctor blades) to remove the dehydrated product from the dryer, but to either utilize draw-off rollers or tension devices or change the doctor scraper blades. When such procedures are not employed, the dehydrated product will be retained on the drying surface for excessive periods with attendant diminishment in flavor and ability to reconstitute. In addition, rice cereal drying has heretofore resulted in loss of product weight and the production of a fragile flake, thereby necessitating over-weight packaging to insure prescribed headspace requirements.

It has now been found that when certain ester-containing additives are included in a rice cereal puree composition, conventional dehydration techniques produce a dried product which is neither sticky nor difficult to remove from the drying surface. Simple drum dryers, which merely employ standard scraping devices without tension rollers or the like for sheet removal, can now be utilized for the drying of the rice cereal purees and the desired continuous sheet obtained.

The organic additives, hereinafter referred to as "releasing agents," which have been found to minimize, in some unknown manner, the heretofore detrimental effect that high temperature drying apparently has on certain physical properties of rice cereal slurries, are those which contain at least one ester linkage

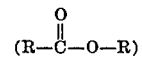

an ester linkage resulting from the condensation reaction of an organic acid and an organic alcohol. The esters are derived from fatty acids or alcohols and therefore contain a long hydrocarbon chain. In addition, the esters are commonly identified as "emulsifiers" and have the requisite chemical structure although they do not necessarily function as emulsifiers in the present environment.

Most importantly, the ester molecule contains an oxygenated polar group such as a phosphatide linkage. Phosphatides, a group of complex lipids containing a phosphoric acid grouping and a nitrogenous base, in addition to other acid components, have been found to be essential to this invention. A preferred ester of this grouping has been found to be lecithin, a commercial name for a mixture of fat-like compounds containing a phosphoric acid redical. The phosphoric acid is further esterified with choline, ethanolomine, and inositol. A typical structure for a phosphatidyl choline is given below:

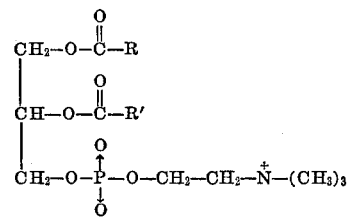

wherein R and R' are hydrocarbons of 2 to 26 carbon atoms. These compounds are called "phospholipids" or "phosphatides." Commercial lecithin is a phosphatide residue obtained in the manufacture of soybean oil by the addition of moisture, centrifugation, and then drying under vacuum. In general, phosphatides such as lecithin are found everywhere in the animal and vegetable kingdoms where oil is present. In the seeds of plants, the phosphatides are largely associated with the oil, the proportion varying with the protein content rather than the oil content. These releasing agents by their mere presence in the puree composition, unexpectedly assist in the release of rice cereal compositions, when dehydrated, from a heated drying surface.

The esters which form an integral portion of the releasing agents of this invention are prepared from acids, such as saturated and unsaturated monobasic acids of from 4 to 26 carbon atoms, preferably from 14 to 18 carbon atoms; dibasic acids of from 2 to 10 carbon atoms, preferably from 3 to 7 carbon atoms; and the salts thereof.

Examples of typical monobasic acids employed as starting materials for the esters of this invention include; stearic acid, palmitic acid, oleic acid, lignoceric acid, nervonic acid, myristic acid, arachidic acid, behenic acid, ricinoleic acid and the like. Examples of preferred monobasic acids are linoleic, arachidic, palmitic, stearic, myristic and oleic acids. Examples of dibasic acids advantageous herein include: malonic acid, succinic acid, glutaric acid, adipic acid, pimelic acid and the like.

The types of alcohols which, when reacted with the above-mentioned acids, result in edible esters effective for the purposes of this invention, include saturated and unsaturated monohydric alcohols of from 2 to 26 carbon atoms, preferably 14 to 18 carbon atoms; and saturated and unsaturated polyhydric alcohols of from 2 to 10 carbon atoms, preferably of from 4 to 8 carbon atoms.

Illustrative of monohydric alcohols suitable as starting materials for the esters of this invention are myristyl alcohol, cetyl, alcohol, stearyl alcohol and the like. Dihydric alcohols advantageous for this invention include ethylene glycol and the like, while trihydric alcohols include glycerol, sorbitol and the like.

The ester-containing releasing agents of this invention may be employed in quantities up to 5% by weight of formula solids, but have been found to be advantayeous in amounts as small as 0.01%, by weight of formula solids. When employed in concentrations from about 0.1 to about 1.0% by weight of formula solids, these releasing agents have been found to be especially effective in assisting in the production of a dehydrated cereal which, not only releases easily from the drying surface, but also results in a teconstitutable product that has improved mixing properties.

The rice cereal compositions of this invention may include, in addition to cereal and the edible organic emulsifier, certain quantities of rice or rice flour, rice polish, dicalcium phosphate, salt, sodium iron pyrosphospate and vitamins. In addition, various acids, vitamins, and other miscellaneous ingredients may be employed as desired to create an optimum product.

The use of fluid milk, and preferably whole milk or non-fat dry milk powder in amounts up to 25%, and particularly from about 5 to about 15%, by weight of the slurry, can also be employed to significantly improve and enhance the natural flavor of the product.

Vegetable oils, such as soya oil, sesame oil, rice oil and the like, may also be desirable ingredients when employed in amounts of about 1 to 3% by weight of the slurry. The vegetable oil also aids in release of the dried sheet, improves the general character of the sheet, and results in a more desirable flake.

Various food acids, e.g. citric acid, fumaric acid, malic acid and the like may be employed in amounts from 0.1 to 8% and preferably about 0.5 to 3.0%, by weight, to adjust the pH to about 3.5 to 5.5, preferably 4.5 to 5.0, this range having been found most effective for enhancing the natural flavor when the product is reconstituted.

The object of dehydrating is to remove as much of the water present in the puree as possible without detrimentally effecting its quality. Therefore, the final products envisioned by this invention usually contains at least 90% solids and preferably from 95 to 98% solids.

The novel reconstitutable rice cereal puree of this invention can be prepared by any of the conventional methods, well known to those of skill in the art. For example, a slurry can be prepared by mixing rice cereal flour, granulated white sugar, milk (or milk concentrate), vegetable oil and the ester-containing releasing agent along with any other ingredients, such as minerals or vitamins which may be deemed desirable; and sufficient water so that the solids content of the resulting slurry will be from about 15 to 30% by weight and preferably about 25%. It will be recognized that the solid concentration of the slurry will control the characteristics and properties of the resulting dehydrate product, as well as controlling the amount of water which necessarily must be removed in the drying operation.

The slurry is then passed through a screen to produce a puree of uniform consistency. Conventional screening devices with openings of about 0.033 inch are frequently employed.

Subsequently heating of the slurry to 140 to 230° F., and preferably 190 to 205° F., in conventional equipment such as atmospheric, vacuum, pressure-cooking tanks or suitable for dehydration.

Next, drying is accomplished, not only to remove a substantial portion of the water contained in the puree, but to complete the cooking process. Drying means include, e.g. any of the conventional equipment readily available, such as single or double drum dryers well known in this art. The dehydrated puree is most easily removed from the drying surface as a continuous sheet, preferably having a thickness of 4-7 mils, and without sticking, balling or lumping with, e.g. a conventional doctor blade.

When using such drum dryers, the film thickness will obviously be dependent on the spacing between the drums, the drum speed, the type of puree being treated and the steam pressure in the drums. The steam pressure can be advantageously employed in the range of 30 to 90 p.s.i.g. It has been found that an optimum product is obtained when the drying means, especially double drum dryers, are run at high drum temperatures and drum pressure. However, none of these factors will deter the effectiveness with which the ester-containing releasing agents of this invention enhance the release of the dried sheet from the drying surface.

The dried rice cereal sheet may be prepared for packaging and ultimate consumption by flaking into various sizes. Here again, the flasking is accomplished in standard equipment such as a 10 mesh U.S. sieve series screen (0.030" wire). However, when the particle size of the finished product is too fine, the particles may tend to lump and therefore be difficult to rehydrate.

Although this invention negates the necessity of tension or draw-off rollers, it is within the skill of this art to employ such devices if desired.

To further illustrate the novel process of the invention, the following example is provided. It should be understood that the details thereof are not to be regarded as limitations as they may be varied as will be understood by one skilled in this art. The percentages included throughout this disclosure are based on the total weight of the slurry composition prior to hydration.

A rice cereal slurry was prepared in approximately the following proportions.

| Ingredients: | Quantity parts by weight |
| --- | --- |
| Rice flour | 800 |
| Rice polish | 300 |
| Dicalcium phosphate | 36 |
| Sodium chloride | 20 |
| Lecithin | 8 |
| Vitamins, seasoning, acid, etc. | 1 |

Sufficient water was added to reduce the overall solids content to about 22.6%.

The slurry, having a pH of about 5.0, was pumped through a line strainer having a screen size of 0.060 inch to a holding tank at a temperature of about 160°–180° F., from where it was transferred to an agitating heater at about 205° F. The heated slurry was then fed to a conventional double drum dryer, each drum operating at an internal pressure of 80 p.s.i.g. The drums were rotated at 5 revolutions per minute and the dried sheet removed with doctor blades. The resulting sheet was non-plastic, continuous and had a film thickness of about 5 mils. The doctor blades were loosely held to the drums, yet the sheet was readily removed. Once equilibrium of operation was established, no losses of dried puree were incurred on the dryer surface.

A similar test was conducted with a regular slurry, i.e., one not containing lecithin. The production rate was increased by 50% when drying the lecithin-containing slurry, while steam requirements were reduced from 7.5 pounds/pound to dry cereal to 6.0 pounds/pound of dry cereal.

The dried rice cereal sheet was continuously conveyed to a flaker employing a No. 5 (U.S. Standard) screen size. The resulting flaked product had a moisture content of 2%. The dried product was stored overnight, then reconstituted with about five times its weight in water and a smooth textured rice cereal with a distinctive natural flavor was obtained.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A process for preparing a pre-cooked, dried rice cereal product that is easily removable from a heated drying surface and capable of being readily reconstituted by hydration comprising: preparing a slurry consisting of rice cereal containing about .01–5.0% by weight of an ester-containing organic releasing agent, wherein the ester is the reaction product of an acid selected from the group consisting of saturated and unsaturated monobasic fatty acids of from 4–26 carbon atoms, dibasic acids of from 2–10 carbon atoms, and the salts thereof, and an alcohol selected from the group consisting of saturated and unsaturated monohydric alcohols of from 2–26 carbon atoms, and saturated and unsaturated polyhydric alcohols of from 2–10 carbon atoms with the proviso that the ester molecule contains at least one phosphatide linkage; dehydrating said slurry on a drying surface; and removing the resulting dehydrated product from said drying surface.

2. A process in accordance with claim 1 wherein said ester is lecithin.

3. A process in accordance with claim 1 wherein said ester is present in an amount of from 0.1 to 1.0% by weight of slurry solids.

References Cited
UNITED STATES PATENTS

| | | | |
|---|---|---|---|
| 3,506,447 | 4/1970 | Billerbeck et al. | 99—83 |
| 3,429,711 | 2/1969 | Billerbeck et al. | 99—83 |
| 3,203,111 | 8/1965 | Lorant et al. | 99—204 |

RAYMOND N. JONES, Primary Examiner